July 11, 1961   W. HANSSMANN   2,991,648
APPARATUS FOR HARDNESS TESTING
Filed Nov. 21, 1956
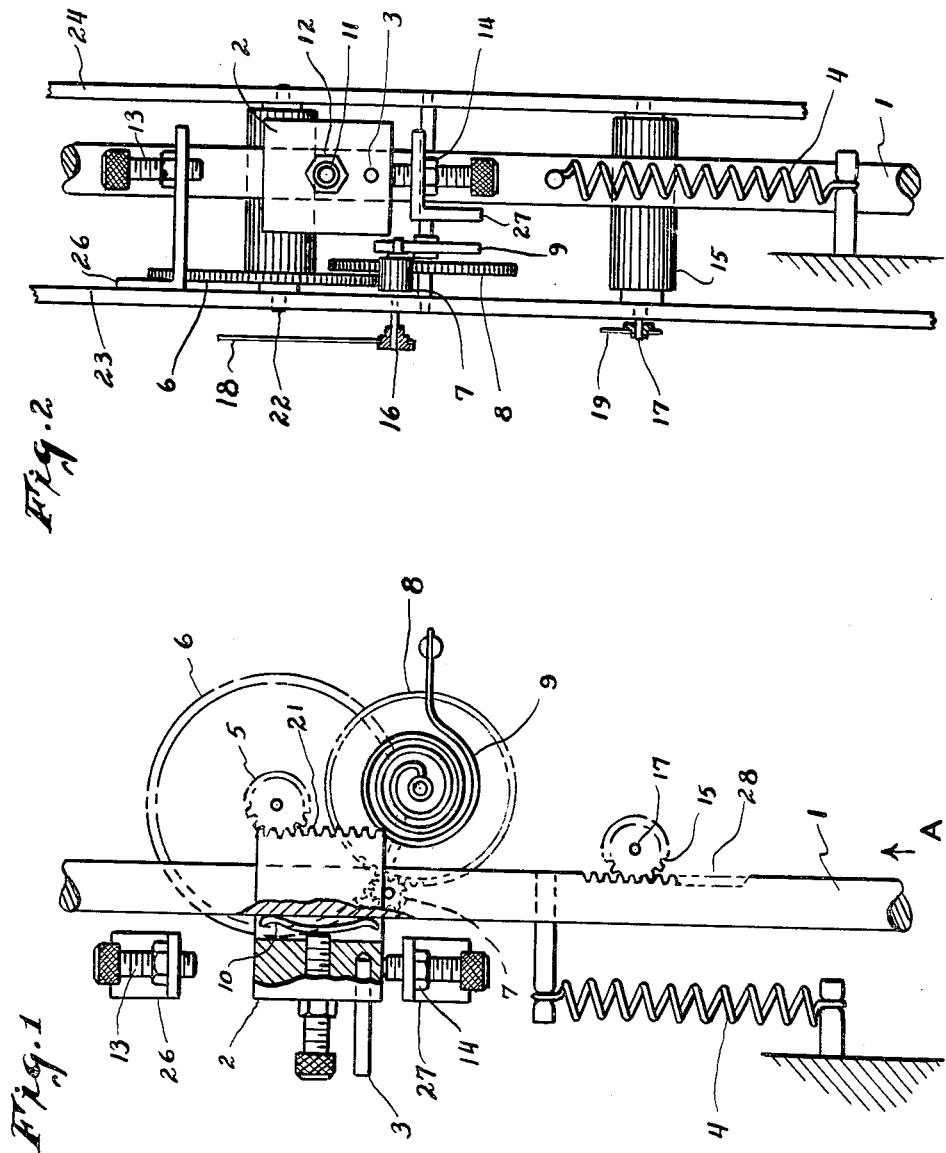
INVENTOR.
WALTER HANSSMANN
BY
Mestern & Rollin,
ATTORNEYS 2,991,648
APPARATUS FOR HARDNESS TESTING
Walter Hanssmann, Schwenningen (Neckar), Germany, assignor to Fa. Friedrich Rambold K.G., Villingen (Schwarzwald), Germany
Filed Nov. 21, 1956, Ser. No. 623,742
Claims priority, application Germany Nov. 23, 1955
3 Claims. (Cl. 73—81)

The present invention relates to an apparatus for hardness tests, according to the Rockwell method, with automatic zero setting.

Considerable time, compared to the time required for a measurement, is necessary to manually set the apparatus at zero position at the beginning of each measurement. Hence several arrangements for automatic zeroing have been designed, which arrangements involve electromagnetic, mechanical, or most frequently friction clutches.

One of the known apparatus for hardness testing with friction clutch is provided with a hand, frictionally connected to the hand drive. The hand can be arrested by two stops arranged on a testing pin which enter the circular path of the hand when the feeler moves. Due to the bending of the hand inaccuracies may occur in this type of hardness indicator; and uneven sliding may occur due to the small diameter of the the driving shaft compared to the length of the hand.

In another known apparatus for hardness testing the hand is arrested in its zero position by a slidingly mounted gear of the indicator drive. This arrangement also proved unsatisfactory. Again a comparatively small frictional surface is available so that the setting of the correct frictional force within narrow limits is very difficult. Further, for the same reason, the frictional clutch is not sufficiently stable. This necessitates comparatively frequent setting or adjustment which is extremely difficult, since the drive has to be disassembled, reset, and assembled, which is a time consuming operation.

It is one object of this invention to overcome these difficulties encountered in hardness indicators for Rockwell tests with automatic zero setting and with a frictional clutch betwen the testing pin and the hand drive.

According to the present invention, the testing pin of the apparatus for hardness testing cooperates with a rack sleeve by means of an adjustable frictional spring which rack engages an intermediate gear in turn controlling the indicator hand. An adjustable stop corresponding to the zero position, is placed in the path of the rack sleeve.

In this arrangement a comparatively large frictional surface is available so that the frictional force per unit surface need not be as large and consequently setting is easier and can be done for smaller frictional forces. A further result is a stable setting which will hold well. Also it is not necessary to disassemble the drive for an occasional resetting of the friction clutch. The setting control, for instance a screw secured by a nut and provided with a knurled button, is readily accessible.

Both stops, the stop preventing the hand from passing its zero position and the stop located in the opposite direction of the testing pin movement, can be arranged in a structurally simple and readily understood manner in the path of the rack sleeve so that they are readily accessible and easily adjusted.

Further according to the invention the testing pin carries an additional set of teeth engaging an additional gear which drives an indicator for the relative displacement of the testing pin and the rack sleeve at zeroing.

In the accompanying drawing one embodiment of the invention is shown by way of example, but it should be understood that this is given by way of illustration and not of limitation and that changes in the details may be made without departing from the spirit of the invention.

In the drawing,

FIG. 1 is a top view, partly in section of the apparatus for hardness testing according to the present invention, and FIG. 2 is a side view of the hardness indicator shown in FIG. 1.

Referring to the drawing, a rack sleeve 2 is provided with a guide 3 and connected to a testing pin 1 by means of a friction clutch 10 loaded by a tension spring 4. The teeth of the sleeve 2 engage a pinion 5 rigidly connected to a gear 6. The gear 6 drives a gear 7 mounted on a shaft 16 for the indicator hand and affected by an equalizing spring 9, serving to eliminate back lash, via a further gear 8.

The testing pin 1 is operatively connected to the rack sleeve 2 by means of a friction coupling embodied by a bent flat spring 10 accurately adjustable by a screw 11 having a knurled head and a nut 12.

Above the rack sleeve 2 is an adjustable stop 13; its position corresponds to the zero position of the indicator hand drive. Below the rack sleeve 2 is a similar stop 14 which is arranged a short distance before the end of the measuring range in reference to the path of the rack sleeve 2.

The testing pin 1 has a toothed lower section which engages a further pinion 15, mounted on a shaft 17 which carries a hand, not shown.

The hardness indicator according to the present invention operates as follows:

When testing pin 1 is moved upwards, the rack sleeve 2 is shifted by the friction spring 10. Hence the gears 5, 6, and 7 and the axle 16 for the hand rotate, setting the hand of the hardness indicator. When stop 13 is reached, the rack sleeve 2 and the indicator drive are arrested in their zero position.

If the testing pin 1 is moved further, the indicator remains in its zero position and the relative displacement between the testing pin 1 and the rack sleeve 2 is indicated by the hand on the gear axle 17 rotated by gear 15.

Upon loading, the testing pin 1 and the rack sleeve 2 move downwards in the opposite direction and the rack sleeve 2, displaced by the friction spring 10, operates the gear drive 5, 6 and 7 and hence the indicator hand.

After completion of the measurement and when the rack sleeve 2 abuts against the lower stop 14, the testing pin 1, overcoming the frictional force of the spring 10, is pulled further down to its initial position by the tension spring 4. Hence all displacements of the testing pin 1 and the rack sleeve 2 due to the zero setting are wiped out.

What I claim is:

1. Measuring instrument with automatic zero setting means for hardness testing devices according to the Rockwell-method, comprising, a longitudinally disposed testing pin, a rack sleeve being frictionally mounted so as to be slidable relative said testing pin, intermediate gearing means, an indicator hand being in engagement with said intermediate gearing means, said gearing means being in mesh with said rack sleeve, said rack sleeve comprising an adjustable plate spring adapted to produce a frictional engagement between said rack sleeve and said testing pin, and an adjustable zero stop in the path of said rack sleeve, said stop corresponding to the zero position of the indicator hand at the beginning of measuring the penetration depth.

2. Measuring instrument as claimed in claim 1, comprising an additional adjustable stop in the path of said rack sleeve, said additional stop corresponding to the position of rest of all parts of the instrument.

3. Measuring instrument as claimed in claim 1, in which said testing pin has a toothed section, said section being in mesh with an auxiliary pinion, the shaft of said pinion being provided with an additional hand.

References Cited in the file of this patent

UNITED STATES PATENTS

| | | |
|---|---|---|
| 2,406,793 | Benkoe | Sept. 3, 1946 |
| 2,553,755 | Dietert et al. | May 22, 1951 |
| 2,645,934 | More | July 21, 1953 |
| 2,832,151 | Emery | Apr. 29, 1958 |

FOREIGN PATENTS

| | | |
|---|---|---|
| 707,744 | Germany | July 2, 1941 |
| 933,066 | Germany | Sept. 15, 1955 |